United States Patent Office 2,763,697
Patented Sept. 18, 1956

2,763,697

PROCESS OF HYDRATING ETHYLENE WITH COPPER FLUOBORATE CATALYST

Hugh J. Hagemeyer, Jr., and William J. Clegg, Kingsport, Tenn., assignors to Eastman Kodak Company, Rochester, N. Y., a corporation of New Jersey No Drawing. Application August 28, 1951,
Serial No. 244,092

1 Claim. (Cl. 260—641)

This invention relates to the direct hydration of olefins, and more particularly to the direct hydration of ethylene to ethyl alcohol in the presence of novel catalysts.

We have found that at temperatures of from 200° C. to 400° C., and elevated pressures, ethylene and water combine, both in the liquid and in the vapor phase, in the presence of heavy metal fluoborates as catalysts, to form ethyl alcohol. The heavy metal fluoborates are highly efficient catalysts for ethylene hydration. They are stable under hydration conditions both in the vapor phase and in the liquid phase, and function as true catalysts in that they can be used over and over again. Among the heavy metal fluoborates which we have found to be active as catalysts for the direct hydration of ethylene are the fluoborates of copper, zinc, tin, iron, chromium, silver, lead, indium, nickel and cadmium. All of these heavy metal fluoborates are highly effective catalysts and produce equilibrium concentrations of alcohol in a relatively short time, as compared to equal concentrations of phosphoric acid.

We attribute the superiority of the heavy metal fluoborates as ethylene hydration catalysts to their ability to combine with water to form a highly dissociated complex which has an exaggerated affinity for the olefinic double bond:

Another advantage of the heavy metal fluoborates as ethylene hydration catalysts is the fact that they do not require the special handling techniques required for hydrogen fluoride and other highly corrosive materials. Their corrosion properties are similar to those of the common dilute mineral acids, and they can be contained by the same materials.

In carrying out the hydration of ethylene in the liquid phase according to our invention, ethylene and steam in stoichiometric proportions are charged to an aqueous solution of a heavy metal fluoborate at 200–400° C. and 100–700 atmospheres pressure. Catalyst concentrations of as high as 40% may be used, but in general we prefer to use catalyst concentrations of from 3% to 20%. In continuous operation, the alcohol formed can be distilled off continuously from the reactor space, or the liquid can be drawn off continuously, the alcohol stripped from it, and the stripped catalyst liquid returned to the reactor space.

Catalysts for vapor phase operation are prepared by impregnating a suitable porous carrier with the desired heavy metal fluoborate. Carriers which may be used include activated carbon, silica gel, diatomaceous earth, and the like. Heavy metal fluoborate concentrations of from 5% to 30% (based on the combined weight of heavy metal fluoborate and carrier) have been found to be suitable. The vapor phase operation can be carried out at from 200° C. to 400° C. and from 30 to 700 atmospheres pressure. We prefer to operate at from 250° C. to 325° C. and from 50 to 200 atmospheres pressure. The ethylene and steam are passed over the catalyst and the product condensed under pressure to separate the alcohol-water mixture from unreacted ethylene, which is recycled to the reactor space. Additional ethylene and steam are supplied to the circulating gas stream as required to maintain the desired ethylene concentration.

The following procedure was used in determining the catalytic activity of the heavy metal fluoborates. A 3% solution of the heavy metal fluoborate was placed in a one-liter copper-lined autoclave. The system was purged with ethylene and heated to 300° C. Ethylene was then pumped in to maintain a pressure of 2000–3000 p. s. i. The autoclave was cooled by an air blast, and the charge poured out and distilled to recover the alcohol. Some of the results obtained are reported in Table I.

Table I

| Example | Catalyst | Temp., °C. | Pressure in p. s. i. | Time in Hours | Wt. Percent Alcohol in Product | Grams of Alcohol | Grams of Ether |
|---|---|---|---|---|---|---|---|
| 1 | 3% Zn(BF$_4$)$_2$ | 300 | 2,100–3,000 | 2 | 4.17 | 23.9 | |
| 2 | 3% Ni(BF$_4$)$_2$ | 300 | 2,600–3,000 | 2 | 4.50 | 21.4 | |
| 3 | 3% Fe(BF$_4$)$_2$ | 300 | 2,200–3,000 | 2 | 4.37 | 22.0 | |
| 4 | Recycle of No. 1 | 300 | 2,700–3,000 | 11 | 7.55 | 39.0 | |
| 5 | 3% Sn(BF$_4$)$_2$ | 300 | 2,500–3,000 | 4.5 | 7.40 | 39.6 | 3.6 |
| 6 | 3% Cu(BF$_4$)$_2$ | 300 | 2,600–3,000 | 5.75 | 8.66 | 46.8 | |
| 7 | 3% Pb(BF$_4$)$_2$ | 300 | 2,500–3,000 | 6 | 7.63 | 41.1 | |
| 8 | 3% Cr(BF$_4$)$_2$ | 300 | 2,300–3,000 | 4 | 7.75 | 39.3 | 2.1 |

By way of illustrating the vapor phase operation of the process of our invention, we give the following example.

Example 9.—Into a circulatory system comprising a reactor packed with a catalyst consisting of 30% of copper fluoborate impregnated on kieselguhr, a primary compressor, a recycle compressor, a separator and a product pot, ethylene and steam were charged at 290° C. and 2,000 p. s. i. pressure. A ratio of 3 volumes of ethylene to 1 volume of steam at the reactor conditions was employed, and the per cent of ethylene in the system was approximately 75%. With a contact time of approximately 11 seconds per pass, the liquid condensate taken off at the product pot contained between 16% and 19% ethyl alcohol. A material balance made on a run which lasted for 96 hours gave the following results:

```
                                                         Percent
Per cent ethylene in the system_____ 75
Per cent ethylene available for hydration converted
  to ethyl alcohol_____ 93.2
Converted to diethyl ether_____ 4.2
Converted to polymeric materials_____ 2.4
```

What we claim as our invention and desire to be secured by Letters Patent of the United States is:

A process for the direct, vapor-phase hydration of ethylene to ethyl alcohol, which comprises passing a mixture of ethylene and steam, at a temperature of from 250° C. to 325° C. and a pressure of from 50 to 200 atmospheres, over a catalyst comprising essentially from 5% to 30%, based on the combined weight of copper fluoborate and carrier, of copper fluoborate impregnated on a porous carrier.

References Cited in the file of this patent

UNITED STATES PATENTS

| | | |
|---|---|---|
| 1,977,633 | Horsley | Oct. 23, 1934 |
| 2,135,455 | Loder | Nov. 1, 1938 |
| 2,162,913 | Eversole et al. | June 20, 1939 |
| 2,457,882 | Frey | Jan. 4, 1949 |
| 2,466,706 | Hughes et al. | Apr. 12, 1949 |

OTHER REFERENCES

Funk et al.: Z. Anorg. Allgens. Chem., vol. 155 (1926), pp. 327–32 via Chem. Abs., vol. 21 (1927), p. 214.

Parkes: Mellor's Modern Inorganic Chemistry (1951), Longmans, Green and Company, London; p. 694.